United States Patent
Batni et al.

(10) Patent No.: US 7,801,293 B2
(45) Date of Patent: Sep. 21, 2010

(54) RINGBACK TONE PREFERENCE INFORMATION TO ASSIST SELECTION OF RINGBACK TONE

(75) Inventors: Ramachendra P. Batni, Phoenix, AZ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1309 days.

(21) Appl. No.: 11/272,111

(22) Filed: Nov. 10, 2005

(65) Prior Publication Data
US 2007/0116253 A1    May 24, 2007

(51) Int. Cl.
*H04M 3/42* (2006.01)
(52) U.S. Cl. .................................. 379/207.16
(58) Field of Classification Search ............. 379/207.16
See application file for complete search history.

(56) References Cited

U.S. PATENT DOCUMENTS

| | | | |
|---|---|---|---|
| 2004/0120493 A1* | 6/2004 | Creamer et al. | 379/207.08 |
| 2004/0174983 A1 | 9/2004 | Olschwang et al. | |
| 2005/0105706 A1* | 5/2005 | Kokkinen | 379/201.01 |

FOREIGN PATENT DOCUMENTS

| | | |
|---|---|---|
| WO | WO 2004/064360 A | 7/2004 |
| WO | WO 2005/006721 A | 1/2005 |
| WO | WO 2005/051015 A | 6/2005 |

\* cited by examiner

*Primary Examiner*—Alexander Jamal
(74) *Attorney, Agent, or Firm*—Carmen Patti Law Group LLC

(57) ABSTRACT

Ringback tone preference information, input by a user of a communication device, is presented to a ringback tone service subscriber or a proxy for the ringback tone service subscriber to assist the ringback tone service subscriber or the proxy select a ringback tone to be played to the user of the communication device on a call to the ringback tone service subscriber.

25 Claims, 4 Drawing Sheets

202 Ringback Tone Selection Profile for Ringback Tone Service Subscriber

| Calling Party Number | Ringback Tone Selection |
|---|---|
| 312-111-1111 | Ringback Tone #1 |
| 312-222-2222 | Ringback Tone #2 |
| ... | ... |
| 312-555-5555 | To Be Selected By Subscriber |

Ringback Tone Preference Profile for User #312-555-5555

| Preference | Genre | Examples | Exceptions |
|---|---|---|---|
| Likes | Rock | Artist #1, Song #1 | Artist #2 |
| Likes | Ambience | Artist #3, Sound #1 | Sound #2 |
| Dislikes | Rap | Artist #4 | Artist #5, Song #2 |
| Dislikes | Disco | Artist #6 | None |
| ... | ... | ... | ... |

FIG. 3

RINGBACK TONE PREFERENCE INFORMATION TO ASSIST SELECTION OF RINGBACK TONE

TECHNICAL FIELD

The invention relates generally to communications and more particularly to ringback tone service.

BACKGROUND

Known ringback tone services allow a called party to preselect a ringback tone to be played to a calling party. Traditionally, the calling party would receive standard ringback content before the called party answers the call. The ringback tone service replaces that standard ringback content with a ringback tone selected by the called party. For example, the ringback tone service allows the called party to customize the ringback content that the calling party receives during the ringing phase of a call to the called party. The calling party receives the ringback tone preselected by the called party while waiting for the called party to answer the call.

The called party in one example is the ringback tone service subscriber and controls the selection of the ringback tone. Without assistance, the ringback tone service subscriber may select a ringback tone that the calling party would dislike receiving. As one shortcoming, until the ringback tone service subscriber selects a different ringback tone, the calling party may continue to receive the disliked ringback tone on subsequent calls to the ringback tone service subscriber. As another shortcoming, the ringback tone service subscriber may have been charged a fee for selecting the ringback tone that ends up being disliked by the calling party. As yet another shortcoming, a disliked ringback tone may fail to serve as a proper fashion statement. Therefore, the disliked ringback tone may fail an intended purpose of selecting ringback tones.

If the calling party dislikes the ringback tone, the calling party may attempt to get the ringback tone changed. For example, the calling party may contact the ringback tone service subscriber to indicate that the currently selected ringback tone is disliked and a different ringback tone is desired. As one shortcoming, contacting the ringback tone service subscriber to request a ringback tone selection change may be inconvenient for both the calling party and the ringback tone service subscriber. As another shortcoming, the ringback tone service subscriber may not always honor such requests. For example, the ringback tone service subscriber may forget to make a requested change.

Thus, a need exists for a ringback tone service that assists a ringback tone service subscriber or a proxy for the ringback tone service subscriber select a ringback tone for a calling party that conforms to the ringback tone preferences of the calling party.

SUMMARY

A ringback tone service allows customization of the ringback content that a calling party receives during a ringing phase of a call to a called party. The ringback tone service replaces the standard ringback content that a calling party normally receives with a customized ringback tone. The called party in one example is the ringback tone service subscriber and controls the selection of the ringback tone. To assist the ringback tone service subscriber or a proxy for the ringback tone service subscriber select a ringback tone to be played to the calling party, the ringback tone service presents ringback tone preference information for the calling party to the ringback tone service subscriber or the proxy.

In one embodiment, there is provided a method for presenting ringback tone preference information, input by a user of a communication device, to a ringback tone service subscriber or a proxy for the ringback tone service subscriber to assist the ringback tone service subscriber or the proxy select a ringback tone to be played to the user of the communication device on a call to the ringback tone service subscriber.

In another embodiment, there is provided a method for: receiving ringback tone preference information from a user of a communication device; and storing the ringback tone preference information for later presentation to a ringback tone service subscriber that indicates an intention to select a ringback tone to be played to the user of the communication device on a call to the ringback tone service subscriber.

In yet another embodiment, there is provided an article comprising one or more computer-readable media. The article comprises means in the computer-readable medium for presenting ringback tone preference information, input by a user of a communication device, to a ringback tone service subscriber or a proxy for the ringback tone service subscriber to assist the ringback tone service subscriber or the proxy select a ringback tone to be played to the user of the communication device on a call to the ringback tone service subscriber.

DESCRIPTION OF THE DRAWINGS

Features of exemplary implementations of the invention will become apparent from the description, the claims, and the accompanying drawings in which:

FIG. 2 is a representation of a ringback tone selection profile that stores the ringback tone selections of a ringback tone service subscriber.

FIG. 3 is a representation of a ringback tone preference profile that stores ringback tone preference information input by a user for possible presentation to a ringback tone service subscriber.

DETAILED DESCRIPTION

Figure 1:
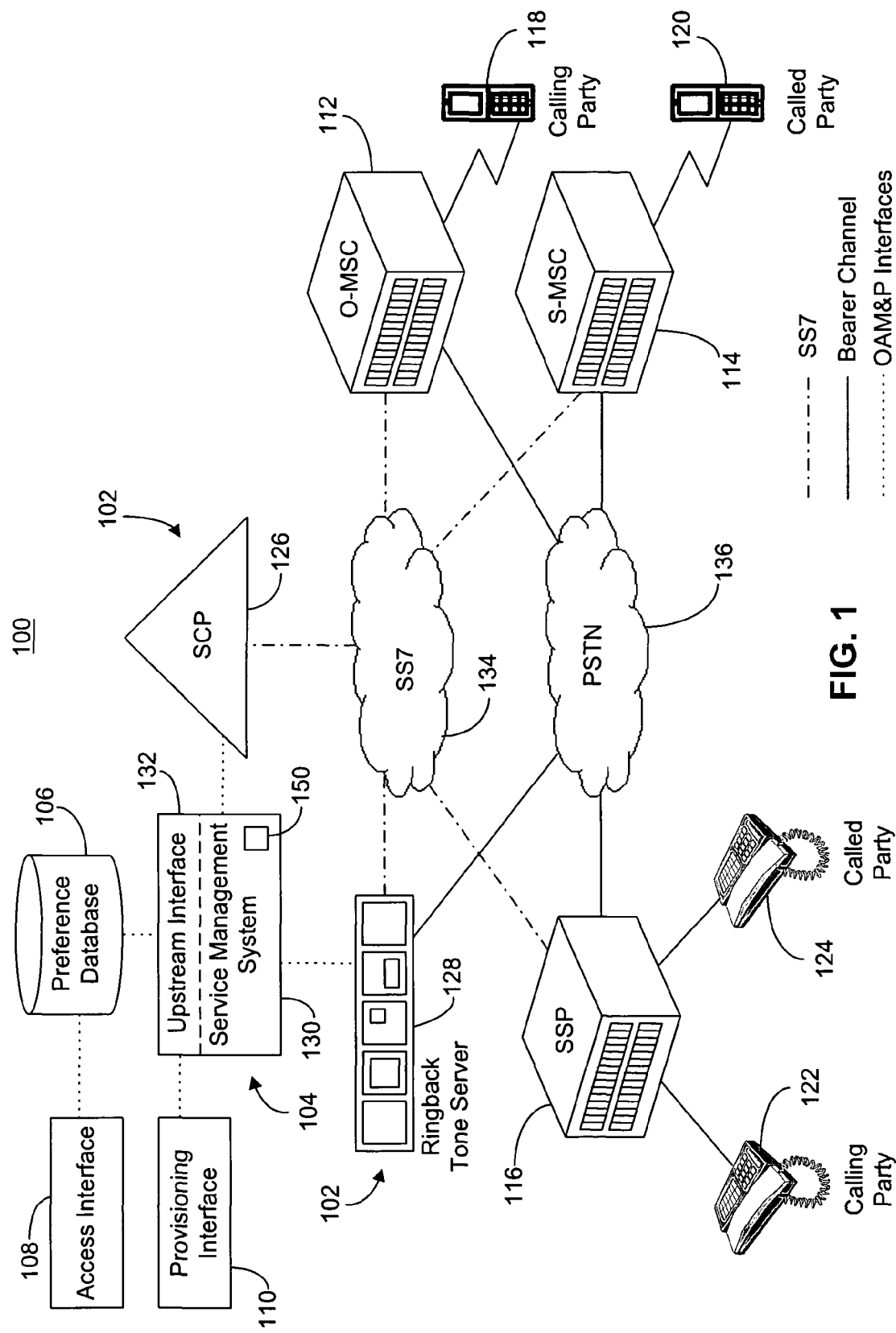
FIG. 1 is a representation of one implementation of an apparatus that comprises one or more intelligent network platforms, one or more management platforms, one or more ringback tone preference databases, one or more access interfaces, one or more provisioning interfaces, one or more mobile switching centers, and one or more service switching points.

Turning to FIG. 1, an apparatus 100 provides a ringback tone service for wireless and/or wire-line telecommunication systems. The ringback tone service in one example replaces the standard ringback content that a calling party normally receives with a ringback tone selected by a ringback tone service subscriber. The ringback tone may comprise audio content, video content, image content, or text content. Without assistance, the ringback tone service subscriber may select a ringback tone that the calling party would dislike receiving. To assist the ringback tone service subscriber select a ringback tone to be played to the calling party, the ringback tone service in one example presents ringback tone preference information for the calling party to the ringback tone service subscriber or a proxy for the ringback tone service subscriber. The ringback tone preference information relates to one or more of audio content, video content, image content, or text content. The ringback tone service subscriber or the proxy may then employ the ringback tone preference information to select a ringback tone that conforms to the ringback tone preferences of the calling party.

The apparatus 100 in one embodiment comprises one or more intelligent network ("IN") platforms 102, one or more management platforms 104, one or more ringback tone preference databases 106, one or more access interfaces 108, one or more provisioning interfaces 110, one or more mobile switching centers ("MSCs") 112 and 114, and one or more service switching points ("SSPs") 116. The MSCs 112 and 114 in one example support wireless communication devices, such as a calling party 118 and a called party 120. The SSP 116 in one example supports wire-line communication devices, such as a calling party 122 and a called party 124.

The intelligent network platforms 102 in one example comprise a service control point ("SCP") 126 and a ringback tone server 128. The SCP 126 and the ringback tone server 128 may be combined into a single intelligent network platform or divided into a plurality of intelligent network platforms. The SCP 126 serves as the ringback tone call controller for the ringback tone service provided by the ringback tone server 128.

A signaling network 134 communicatively couples the SCP 126, the ringback tone server 128, the MSCs 112 and 114, and the SSP 116. The signaling network 134 in one example comprises a signaling system 7 ("SS7") network that supports signaling traffic. A bearer network 136 communicatively couples the ringback tone server 128, the MSCs 112 and 114, and the SSP 116. The bearer network 136 in one example comprises a public switched telephone network ("PSTN") that supports bearer traffic.

The SCP 126 and the ringback tone server 128 serve to route calls and play ringback tones to the calling party (e.g., the calling party 118 or 122) on calls from the calling party to the called party (e.g., the called party 120 or 124). For example, the SCP 126 and the ringback tone server 128 serve to provide the ringback tone service. The SCP 126 in one example provides instruction to the ringback tone server 128 to control the functionality of the ringback tone server 128. For example, the SCP 126 sends messages to the ringback tone server 128 to instruct the ringback tone server 128 to play the ringback tone to the calling party 118 or 122. If an incoming call requires ringback tone service, then the SCP 126 directs the incoming call to the ringback tone server 128 and the ringback tone server 128 plays the specialized ringback tone to the calling party 118. If the incoming call does not require ringback tone service, then the SCP 126 in one example instructs the MSC 112 to provide standard ringback content to the calling party 112.

The SCP 126 and the ringback tone server 128 are connected to the management platform 104 through operations, administration, maintenance, and provisioning ("OAM&P") interfaces, such as: a Transmission Control Protocol/Internet Protocol ("TCP/IP") connection, Lightweight Directory Access Protocol ("LDAP") connection, Extensible Markup Language ("XML") connection, or the like. The ringback tone system in one example employs the management platform 104 to interface with ringback tone service subscribers. The management platform 104 comprises an instance of a recordable data storage medium 150, as described herein.

The management platform 104 in one example comprises a service management system 130 and an upstream interface 132. The service management system 130 comprises a provisioning system. The service management system 130 in one example handles subscriber provisioning, subscriber profile updating, interfacing to content providers, ringback tone distribution to ringback tone servers, and the like. The service management system 130 comprises OAM&P interfaces with the SCP 126 and the ringback tone server 128. The upstream interface 132 comprises OAM&P interfaces with the ringback tone preference database 106 and the provisioning interface 110.

The ringback tone preference database 106 stores the ringback tone preference information input by users of communication devices. The ringback tone preference information in one example indicates the ringback tone content likes and dislikes of the users of communication devices. The physical implementation of the ringback tone preference database 106 can take many forms, such as: a portion of an existing database in the service provider network, a new database in the service provider network, a database that belongs to the network of a different service provider, an industry-wide database, a database shared by a group of service providers, or the like. The ringback tone preference database 106 communicates with the ringback tone service through a messaging protocol, such as: LDAP, XML, Open DataBase Connectivity ("ODBC"), Structured Query Language ("SQL"), or the like. If the ringback tone preference database 106 comprises a distributed database, then discovery mechanisms such as Electronic NUMbering ("ENUM") or Distributed Universal Number Discovery ("DUNDi") can be used to locate the ringback tone preference information.

The access interface 108 provides a mechanism between users (e.g., calling parties) and the ringback tone preference database 106 to input the ringback tone preference information. The provisioning interface 110 provides a connection between the ringback tone service subscribers and the ringback tone preference database 106 via the upstream interface 132 to present the ringback tone preference information for other users to the ringback tone service subscribers. The access interface 108 and the provisioning interface 110 comprise website interfaces, Wireless Application Protocol ("WAP") interfaces, Interactive Voice Response ("IVR") interfaces, Short Message Service ("SMS") interfaces, or the like.

In one example, the ringback tone service subscriber comprises a wireless communication device, such as the called party 120. The wireless ringback tone service subscriber 120 may select specialized ringback tones for the ringback tone service to play to wireless and wire-line communication devices (e.g., the calling party 118 and the calling party 122) that call the wireless ringback tone service subscriber 120. Upon receipt of an incoming call for the wireless ringback tone service subscriber 120 at the MSC 112, the MSC 112 sends signaling relating to the incoming call to the SCP 126. The MSCs 112 and 114 support mobile telecommunication devices, for example, the calling party 118 and the wireless ringback tone service subscriber 120. The MSCs 112 and 114 in one example comprise an originating mobile switching center ("O-MSC") 112 for the wireless ringback tone service subscriber 120 and a serving mobile switching center ("S-MSC") 114 for the wireless ringback tone service subscriber 120. For example, the O-MSC 112 supports a home area of the wireless ringback tone service subscriber 120 and the S-MSC 114 supports the wireless ringback tone service subscriber 120 if the wireless ringback tone service subscriber 120 moves to a roaming area. If the wireless ringback tone service subscriber 120 is within the home area supported by the O-MSC 112, then the S-MSC 114 may not be in the call path between the calling party 118 and the wireless ringback tone service subscriber 120. For example, the O-MSC 112 would also serve as a S-MSC for the wireless ringback tone service subscriber 120. The calling party 118 in one example is supported by the O-MSC 112 of the wireless ringback tone service subscriber 120 (as shown in FIG. 1). The calling party 118 in another example is supported by a different MSC (not shown) and a call from the calling party 118 to the wireless ringback tone service subscriber 120 will pass from the calling party 118 to that other MSC, then through the bearer network 136, and to the O-MSC 112 of the wireless ringback tone service subscriber 120 to locate the wireless ringback tone service subscriber 120 for the call.

In another example, the ringback tone service subscriber comprises a wire-line communication device, such as the called party 124. The wire-line ringback tone service subscriber 124 may select specialized ringback tones for the ringback tone service to play to wireless and wire-line communication devices (e.g., the calling party 118 and the calling party 122) that call the wire-line ringback tone service subscriber 124. Upon receipt of an incoming call for the wire-line ringback tone service subscriber 124 at the SSP 116, the SCP 126 receives signaling relating to the incoming call from the SSP 116. The SSP 116 supports wire-line telecommunication devices, for example, the calling party 122 and the wire-line ringback tone service subscriber 124. The SSP 116 is the service switching point for the wire-line ringback tone service subscriber 124. The calling party 122 in one example is supported by the SSP of the wire-line ringback tone service subscriber 124 (as shown in FIG. 1). The calling party 122 in another example is supported by a different SSP (not shown) and a call from the calling party 122 to the wire-line ringback tone service subscriber 124 will pass from the calling party 122 to that other SSP, then through the bearer network 136, and to the SSP 116 of the wire-line ringback tone service subscriber 124.

Referring to FIG. 2, the ringback tone service in one example maintains a ringback tone selection profile 202 for a ringback tone service subscriber (e.g., the called party 120 or 124). The ringback tone selection profile 202 stores the ringback tone selections of the ringback tone service subscriber. For example, the ringback tone selection profile 202 includes an entry for a calling party 312-111-1111 and an entry for a calling party 312-222-2222. The ringback tone service subscriber selected ringback tone #1 for the calling party 312-111-1111 and ringback tone #2 for the calling party 312-222-2222.

When a calling party calls the ringback tone service subscriber, the ringback tone service accesses the ringback tone selection profile 202 to determine if there is an entry that matches an identifier of the calling party. The identifier may comprise a directory number, Uniform Resource Identifier ("URI"), or the like. If the ringback tone selection profile 202 does not contain an entry for the calling party, then in one example a default ringback tone is provided to the calling party. If the ringback tone selection profile 202 does contain an entry for the calling party, then the ringback tone selection made by the ringback tone service subscriber is provided to the calling party. For example, when the calling party 312-111-1111 calls the ringback tone service subscriber, the ringback tone service provides ringback tone #1 to the calling party 312-111-1111. When the calling party 312-222-2222 calls the ringback tone service subscriber, the ringback tone service provides ringback tone #2 to the calling party 312-222-2222.

The ringback tone selection profile 202 also comprises an entry for a calling party 312-555-5555. As shown in FIG. 2, the ringback tone service subscriber has yet to make a ringback tone selection for the calling party 312-555-5555. After the ringback tone subscriber enters an identifier of the calling party (e.g., directory number 312-555-5555, URI, or the like) and before the ringback tone service subscriber makes a ringback tone selection, the ringback tone service checks whether the calling party 312-555-5555 has input ringback tone preference information to be presented to the ringback tone service subscriber or a proxy for the ringback tone service subscriber, as described below.

Referring to FIG. 3, the ringback tone service in one example maintains a ringback tone preference profile 302 for a user of a communication device (e.g., the calling party 312-555-5555). The ringback tone preference profile 302 can be examined by ringback tone subscribers when those ringback tone subscribers are in the process of provisioning a ringback tone for the calling party 312-555-5555. The ringback tone preference profile 302 in one example is stored in the ringback tone preference database 106 (FIG. 1). The ringback tone preference profile 302 stores ringback tone preference information input by the user for possible presentation to a ringback tone service subscriber (e.g., the called party 120 or 124). In one example, the ringback tone preference information that is input by the calling party 312-555-5555 is presented to the ringback tone service subscriber to assist the ringback tone service subscriber select a ringback tone for the calling party 312-555-5555 that conforms to the ringback tone preferences of the calling party 312-555-5555. In another example, the ringback tone preference information that is input by the calling party 312-555-5555 is presented to a proxy for the ringback tone service subscriber. Presentation in one example may take any form that can be seen or heard by the ringback tone service subscriber or the proxy.

The ringback tone preference information in one example indicates one or more ringback tone genres that the calling party 312-555-5555 would like to receive during a ringing phase of an outgoing call. The ringback tone preference profile 302 comprises one or more entries that indicate types of ringback tones that the calling party 312-555-5555 likes. For example, the ringback tone preference profile 302 comprises "likes" entries for ringback tones in the rock and ambiance genres. If the calling party 312-555-5555 wanted to indicate a dislike of all ringback tones, then the calling party 312-555-5555 could input "none" in a "likes" entry.

The ringback tone preference information in another example indicates one or more ringback tone genres that the user of the communication device would dislike receiving during the ringing phase of an outgoing call. The ringback tone preference profile 302 comprises one or more entries that indicate types of ringback tones that the calling party 312-555-5555 dislikes. For example, the ringback tone preference profile 302 comprises "dislikes" entries for ringback tones in the rap and disco genres. If the calling party 312-555-5555 wanted to indicate a dislike of all ringback tones, then the calling party 312-555-5555 could input "all" in a "dislikes" entry.

The ringback tone preference information in the ringback tone preference profile 302 in one example also indicates one or more examples or exceptions within the liked or disliked ringback tone genres. The examples and exceptions may identify specific artists, albums, songs, or sounds. The examples provide the ringback tone service subscriber with more information about the type of ringback tones that fall within the liked or disliked ringback tone genres. For example, the calling party 312-555-5555 lists artist #1 and song #1 as examples of the rock genre that is listed in a "likes" entry. The calling party 312-555-5555 also lists artist #4 as an example of the rap genre that is listed in a "dislikes" entry. The exceptions to a liked ringback tone genre identify the ringback tones that may fall within the liked ringback tone genre, but are disliked by the calling party 312-555-5555. The exceptions to a disliked ringback tone genre identify the ringback tones that may fall within the disliked ringback tone genre, but are liked by the calling party 312-555-5555. For example, the calling party 312-555-5555 lists artist #2 as an exception to the rock genre that is listed in a "likes" entry. Therefore, the calling party 312-555-5555 would dislike receiving a ringback tone by artist #2 even though it generally falls within the rock genre. The calling party 312-555-5555 also lists artist #5 as an exception to the rap genre that is listed in a "dislikes" entry. Therefore, the calling party 312-555-5555 would like to receive a ringback tone by artist #5 even though it generally falls within the rap genre.

Figure 4:
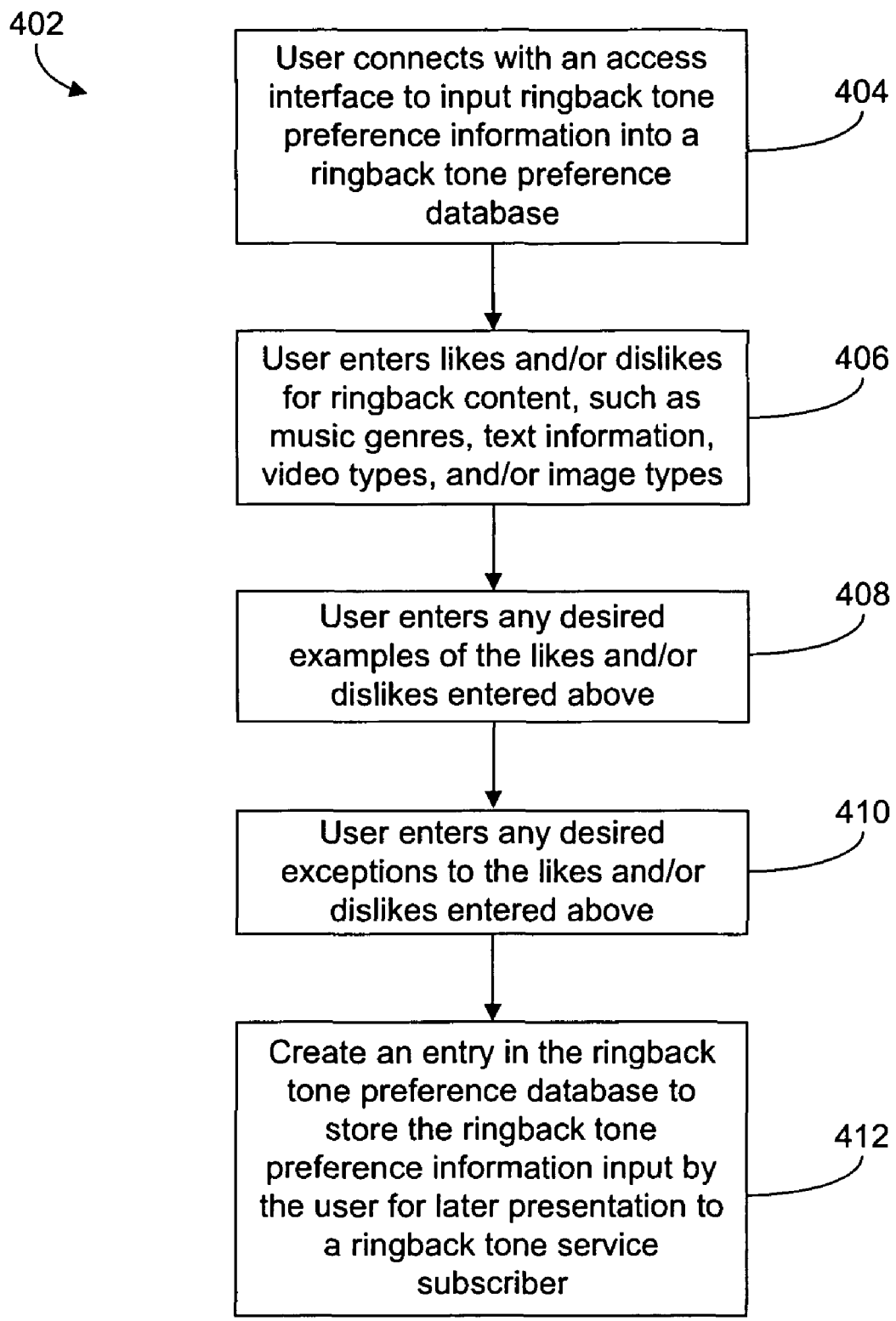
FIG. 4 is a representation of one exemplary logic flow that illustrates a connection between a user of a communication device and a ringback tone preference database for the user to input ringback tone preference information.

Referring to FIGS. 1 and 4, an illustrative description of one exemplary operation of the apparatus 100 is presented, for explanatory purposes. A message flow 402 represents an exemplary connection between a user of a communication device (e.g., the calling party 312-555-5555) and the ringback tone preference database 106 for the user to input ringback tone preference information. The user in one example need not be a ringback tone service subscriber to input ringback tone preference information. The logic 402 employs one or more steps, for example, STEPS 404, 406, 408, 410, and 412.

At STEP 404, the user connects with the access interface 108 to input ringback tone preference information into the ringback tone preference database 106. For example, the access interface 108 may comprise a website interface where the user inputs the ringback tone preference information. After connection with the access interface 108, STEP 404 proceeds to STEP 406.

At STEP 406, the user enters likes and/or dislikes for ringback content, such as: music genres, text information, video types, or image types. For example, as shown in the ringback tone preference profile 302 (FIG. 3), the user inputs that rock and ambience ringback tone genres are generally liked and rap and disco ringback tone genres are generally disliked. The user may also identify likes and dislikes in other ringback media categories, such as: text information, video types, or image types. After input of the general likes and dislikes of the user, STEP 406 proceeds to STEP 408.

At STEP 408, the user enters any desired examples of the likes or dislikes entered at STEP 406. For example, as shown in the ringback tone preference profile 302 (FIG. 3), the user inputs artist #1 and song #1 as specific examples of the rock genre that is liked by the user. After input of the desired specific examples of the generally liked or disliked ringback tone genres, STEP 408 proceeds to STEP 410. At STEP 410, the user enters any desired exceptions to the likes or dislikes entered at STEP 406. For example, as shown in the ringback tone preference profile 302 (FIG. 3), the user inputs artist #2 as an exception to the rock genre that is generally liked by the user. It is not mandatory for the user to provide inputs at all of the steps. The user can skip a step if the user has no inputs for a step, such as at STEPS 408 and 410. For example, the user may not want to input any exceptions. Therefore, the user could skip STEP 410. After input of the desired exceptions to the generally liked or disliked ringback tone genres, STEP 410 proceeds to STEP 412.

At STEP 412, an entry (i.e., the ringback tone preference profile 302) is created in the ringback tone preference database 106 to store the ringback tone preference information input by the user at STEPS 406, 408, and 410. The ringback tone preference database 106 stores the ringback tone preference information for later presentation to a ringback tone service subscriber, as described below.

Figure 5:
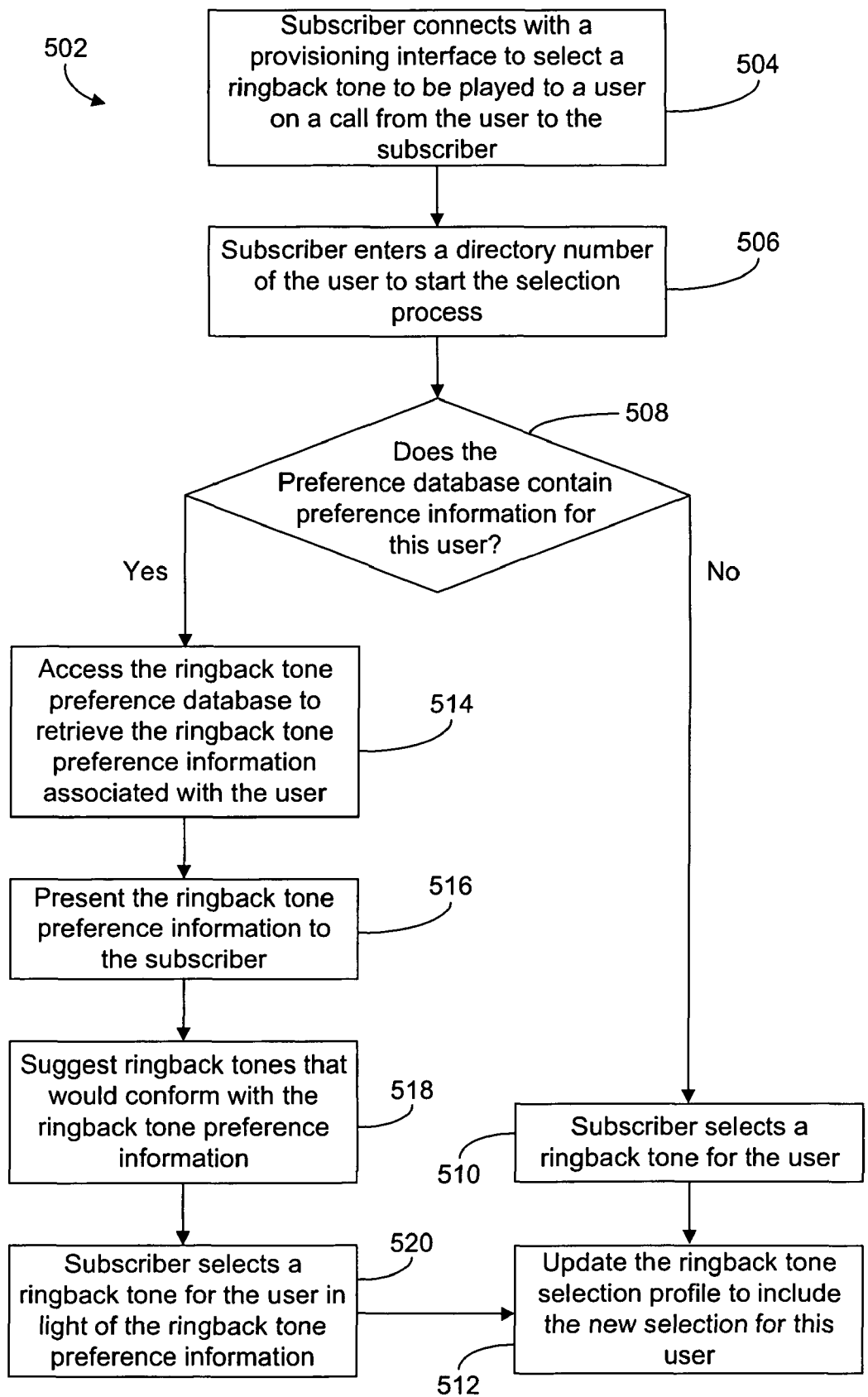
FIG. 5 is a representation of one exemplary logic flow that illustrates a selection of a ringback tone by a ringback tone service subscriber to be played to a user of a communication device on a call to the ringback tone service subscriber.

Referring to FIGS. 1 and 5, an illustrative description of one exemplary operation of the apparatus 100 is presented, for explanatory purposes. A message flow 502 represents an exemplary selection of a ringback tone by a ringback tone service subscriber (e.g., the called party 120 or 124) to be played to a user of a communication device (e.g., the calling party 312-555-5555) on a call to the ringback tone service subscriber. The logic 502 employs one or more steps, for example, STEPS 504, 506, 508, 510, 512, 514, 516, 518, and 520.

At STEP 504, the ringback tone service subscriber connects with the provisioning interface 110 to select a ringback tone to be played to the calling party 312-555-5555 on a call from the calling party 312-555-5555 to the ringback tone service subscriber. For example, the provisioning interface 110 may comprise a website interface where the ringback tone service subscriber provisions ringback tones to be played to calling parties. After connection with the provisioning interface 110, STEP 504 proceeds to STEP 506.

At STEP 506, the ringback tone service subscriber enters an identifier of the user (e.g., a directory number, URI, or the like) to start the ringback tone selection process. For example, the ringback tone service subscriber enters the directory number 312-555-5555 to start a ringback tone selection process for the calling party 312-555-5555. The ringback tone service maintains the ringback tone selection profile 202 (FIG. 2) for the ringback tone service subscriber. When the ringback tone service subscriber enters the directory number 312-555-5555 (or other identifier) into a new entry in the ringback tone selection profile 202, the management platform 104 receives an indication that the ringback tone service subscriber is making a ringback tone selection for the calling party 312-555-5555. The ringback tone selection profile 202, as shown in FIG. 2, contains the start of a ringback tone selection entry for the calling party 312-555-5555. After the ringback tone service subscriber enters the identifier of the calling party 312-555-5555 into the provisioning interface, STEP 506 proceeds to STEP 508.

At STEP 508, the management platform 104 determines whether the ringback tone preference database 106 contains ringback tone preference information for the calling party 312-555-5555. The management platform 104 access the ringback tone preference database 106 to check for an entry associated with the identifier of the calling party 312-555-5555. If the ringback tone preference database 106 does not contain an entry for the identifier of calling party 312-555-5555, then STEP 508 proceeds to STEP 510.

At STEP 510, the ringback tone service subscriber selects a ringback tone for the user. Because the ringback tone preference database 106 does not contain ringback tone preference information for the calling party 312-555-5555, the ringback tone service subscriber selects a ringback tone without assistance from ringback tone preference information input of calling party 312-555-5555. After the ringback tone service subscriber selects a ringback tone for the user, STEP 510 proceeds to STEP 512.

At STEP 512, the ringback tone selection profile 202 (FIG. 2) of the ringback tone service subscriber is updated to include the new ringback tone selection for the calling party 312-555-5555. For example, where the ringback tone service subscriber selects ringback tone #3 for the calling party 312-555-5555, the ringback tone selection column in the entry for the calling party 312-555-5555 is updated to include an indication of the ringback tone #3. After the ringback tone selection is finalized, when the calling party 312-555-5555 makes a call to the ringback tone service subscriber, the ringback tone server 128 in one example plays the ringback tone #3 to the calling party 312-555-5555 during the ringing phase of the call.

At STEP 508, if the management platform 104 determines that the ringback tone preference database 106 does contain an entry for the identifier of the calling party 312-555-5555, then STEP 508 proceeds to STEP 514. At STEP 514, the management platform 104 accesses the ringback tone preference database 106 to acquire the ringback tone preference information associated with the calling party 312-555-5555. The ringback tone service in one example comprises a database that has been pre-provisioned with the address of the ringback tone preference database 106 to be accessed for a given calling party identifier. The database is also pre-provisioned with the messaging protocols to be used to contact the ringback tone preference database 106. The management platform 104 in one example employs the identifier of the calling party 312-555-5555 to search the ringback tone preference database 106 for the ringback tone preference information that is associated with the calling party 312-555-5555. After the management platform 104 acquires the ringback tone preference information associated with the calling party 312-555-5555, STEP 514 proceeds to STEP 516.

At STEP 516, the management platform 104 presents the ringback tone preference information associated with the calling party 312-555-5555 to the ringback tone service subscriber or a proxy for the ringback tone service subscriber. A customer care representative or other person/entity may act as the proxy for the ringback tone service subscriber and make the appropriate ringback tone selection for the ringback tone service subscriber.

In one example, the management platform 104 displays the ringback tone preference information on a computer screen viewable by the ringback tone service subscriber or the proxy. In another example, the management platform 104 displays the ringback tone preference information on a display screen of the handheld communication device used by the ringback tone service subscriber or the proxy to make the ringback tone selection. In yet another example, the management platform 104 presents the ringback tone preference information to the ringback tone service subscriber or the proxy over an Interactive Voice Response ("IVR") system. After the management platform 104 presents the ringback tone preference information for the calling party 312-555-5555 to the ringback tone service subscriber or the proxy, STEP 516 proceeds to STEP 518.

At STEP 518, ringback tones are suggested to the ringback tone service subscriber or the proxy that would conform to the ringback tone preference information. The management platform 104 in one example analyzes the ringback tone preference information for the calling party 312-555-5555. To further assist the ringback tone service subscriber or the proxy select a ringback tone for the calling party 312-555-5555, the management platform 104 may identify and present one or more suggested ringback tones that would conform to the ringback tone preferences of the calling party 312-555-5555. After the management platform 104 provides all of the ringback tone preference information for the calling party 312-555-555 to the ringback tone service subscriber or the proxy, the management platform 104 waits for a ringback tone selection, and STEP 518 proceeds to STEP 520.

At STEP 520, the ringback tone service subscriber or the proxy selects a ringback tone for the calling party 312-555-5555 in light of the ringback tone preference information received from the management platform 104. If the ringback tone service subscriber follows the ringback tone preference information for the calling party 312-555-5555, then the calling party 312-555-5555 may be more likely to enjoy the ringback tone selected by the ringback tone service subscriber. After deciding on a ringback tone, the ringback tone service subscriber or the proxy sends the ringback tone selection to the management platform 104 to complete the provisioning process, and STEP 520 proceeds to STEP 512. At STEP 512, the ringback tone selection profile is updated to include the new ringback tone selection for the calling party 312-555-5555. For example, where the ringback tone service subscriber selects ringback tone #4 for the calling party 312-555-5555, the ringback tone selection column in the entry for the calling party 312-555-5555 is updated to include an indication of the ringback tone #4.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer readable media. The computer-readable media store software, firmware and/or assembly language for performing one or more portions of one or more embodiments of the invention. Examples of a computer-readable medium for the apparatus 100 comprise the recordable data storage medium 150 of the management platform 104. The computer-readable medium for the apparatus 100 in one example comprise one or more of a magnetic, electrical, optical, biological, and atomic data storage medium. For example, the computer-readable medium comprises floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the step of:
   presenting ringback tone preference information, input by a user of a communication device, to a ringback tone service subscriber or a proxy for the ringback tone service subscriber to assist the ringback tone service subscriber or the proxy select a ringback tone to be played to the user of the communication device on a call to the ringback tone service subscriber, wherein the preference information is based on one or more likes or dislikes of the user of the communication device, and wherein at least one of the likes or dislikes is a specific music album.

2. The method of claim 1, wherein the ringback tone preference information indicates one or more types of ringback tones that the user of the communication device would like to receive during a ringing phase of an outgoing call.

3. The method of claim 2, wherein the ringback tone preference information also indicates one or more examples or exceptions within the one or more types of ringback tones that the user of the communication device would like to receive during the ringing phase.

4. The method of claim 1, wherein the ringback tone preference information indicates one or more ringback tone genres that the user of the communication device would dislike receiving during a ringing phase of an outgoing call.

5. The method of claim 4, wherein the ringback tone preference information also indicates one or more examples or exceptions within the one or more ringback tone genres that the user of the communication device would dislike receiving during the ringing phase.

6. The method of claim 1, wherein the step of presenting the ringback tone preference information comprises the step of:
providing the ringback tone preference information to the ringback tone service subscriber in audible or viewable form.

7. The method of claim 1, further comprising the steps of:
receiving an indication that the ringback tone service subscriber is making a ringback tone selection for the user of the communication device; and
accessing a ringback tone preference database to retrieve the ringback tone preference information that is associated with the user of the communication device.

8. The method of claim 1, further comprising the step of:
accessing the ringback tone preference information associated with the user of the communication device upon receipt of an indication that the ringback tone service subscriber Is making a ringback tone selection for the user of the communication device;
wherein the step of presenting the ringback tone preference information comprises the step of:
sending the ringback tone preference information to the ringback tone service subscriber for display on a communication device associated with the ringback tone service subscriber or a website viewable by the ringback tone service subscriber.

9. The method of claim 1, further comprising the steps of:
interfacing with the ringback tone service subscriber to create an entry in a ringback tone selection profile for the user of the communication device;
receiving an identifier of the user of the communication device input by the ringback tone service subscriber for the entry in the ringback tone selection profile; and
employing the identifier to search a ringback tone preference database for the ringback tone preference information that is associated with the user of the communication device.

10. A method, comprising the steps of:
presenting ringback tone preference information, input by a user of a communication device, to a ringback tone service subscriber or a proxy for the ringback tone service subscriber to assist the ringback tone service subscriber or the proxy select a ringback tone to be played to the user of the communication device on a call to the ringback tone service subscriber, wherein the preference information is based on one or more likes or dislikes of the user of the communication device, and wherein at least one of the likes or dislikes is a specific music album;
interfacing with the ringback tone service subscriber to create an entry in a ringback tone selection profile for the user of the communication device;
receiving an identifier of the user of the communication device input by the ringback tone service subscriber for the entry in the ringback tone selection profile; and
employing the identifier to search a ringback tone preference database for the ringback tone preference information that is associated with the user of the communication device;
wherein the step of presenting the ringback tone preference information further comprises the step of:
sending the ringback tone preference information to the ringback tone service subscriber if the ringback tone preference information is available in the ringback tone preference database;
the method further comprising the steps of:
receiving a ringback tone selection from the ringback tone service subscriber; and
adding the ringback tone selection to the entry in the ringback tone selection profile for the user of the communication device so that the ringback tone is played to the user of the calling communication device, on a call to the ringback tone service subscriber.

11. The method of claim 1, further comprising the steps of:
interfacing with the user of the communication device to receive the ringback tone preference information; and
storing the ringback tone preference information for later presentation to a ringback tone service subscriber that indicates an intention to make a ringback tone selection for the user of the communication device.

12. The method of claim 1, further comprising the steps of:
accessing the ringback tone preference information that is associated with the user of the communication device;
identifying one or more suggested ringback tones based on likes or dislikes of the user of the communication device indicated in the ringback tone preference information; and
presenting indications of the one or more suggested ring tones to the ringback tone service subscriber, along with the ringback tone preference information, to assist the ringback tone service subscriber select the ringback tone to be played to the user of the communication device on the call to the ringback tone service subscriber.

13. The method of claim 1, wherein the ringback tone comprises audio content, video content, image content, or text content;
wherein the ringback tone preference information input by the user of the communication device relates to one or more of audio content, video content, image content, or text content.

14. A method, comprising the steps of:
receiving ringback tone preference information from a user of a communication device; and
storing the ringback tone preference information for later presentation to a ringback tone service subscriber that Indicates an intention to select a ringback tone to be played to the user of the communication device on a call to the ringback tone service subscriber,
wherein the preference information is based on one or more likes or dislikes of the user of the communication device, and wherein at least one of the likes or dislikes is a specific music album.

15. The method of claim 14, wherein the step of receiving the ringback tone preference information comprises the step of:

receiving an indication of one or more types of ringback tones that the user of the communication device would or would not like to receive during a ringing phase of an outgoing call.

16. The method of claim 15, further comprising the step of:

receiving an indication of one or more examples or exceptions within the one or more types of ringback tones that the user of the communication device would or would not like to receive during the ringing phase.

17. The method of claim 14, further comprising the steps of:

accessing the ringback tone preference information associated with the user of the communication device upon receipt of an indication that the ringback tone service subscriber is making a ringback tone selection for the user of the communication device; and presenting the ringback tone preference information to the ringback tone service subscriber to assist the ringback tone service subscriber make the ringback tone selection.

18. A method, comprising the steps of:

receiving ringback tone preference information from a user of a communication device;

storing the ringback tone preference information for later presentation to a ringback tone service subscriber that indicates an intention to select a ringback tone to be played to the user of the communication device on a call to the ringback tone service subscriber, wherein the preference information is based on one or more likes or dislikes of the user of the communication device, and wherein at least one of the likes or dislikes is a specific music album;

accessing the ringback tone preference information associated with the user of the communication device upon receipt of an indication that the ringback tone service subscriber is making a ringback tone selection for the user of the communication device; and presenting the ringback tone preference information to the ringback tone service subscriber to assist the ringback tone service subscriber make the ringback tone selection;

wherein the ringback tone preference information is stored in a ringback tone preference database, and wherein the step of accessing the ringback tone preference information further comprises the steps of:

interfacing with the ringback tone service subscriber to create an entry in a ringback tone selection profile for the user of the communication device;

receiving an identifier of the user of the communication device input by the ringback tone service subscriber for the entry in the ringback tone selection profile; and employing the identifier to search the ringback tone preference database for the ringback tone preference information that is associated with the user of the communication device.

19. The method of claim 14, wherein the ringback tone comprises audio content, video content, image content, or text content;

wherein the ringback tone preference information input by the user of the communication device relates to one or more of audio content, video content, image content, or text content.

20. A computer-readable medium having computer executable instructions for performing steps, comprising:

means in the computer-readable medium for presenting ringback tone preference information, input by a user of a communication device, to a ringback tone service subscriber or a proxy for the ringback tone service subscriber to assist the ringback tone service subscriber or the proxy select a ringback tone to be played to the user of the communication device on a call to the ringback tone service subscriber, wherein the preference information is based on one or more likes or dislikes of the user of the communication device, and wherein at least one of the likes or dislikes is a specific music album.

21. The method of claim 1, wherein another one of the likes or dislikes of the user of the communication device is based on specific artists associated with music.

22. The method of claim 1, wherein other likes or dislikes of the user of the communication device are based on songs or sounds.

23. The method of claim 1, wherein the preference information is displayed on a computer screen viewable by the ringback tone service subscriber or the proxy.

24. The method of claim 1, wherein the preference information is displayed on a display screen of the communication device used by the ringback tone service subscriber or the proxy to make the ringback tone selection.

25. The method of claim 1, wherein the preference information is presented to the ringback tone service subscriber or the proxy over an Interactive Voice Response system.

* * * * *